(No Model.) 2 Sheets—Sheet 1.

H. B. STEVENS.
EVAPORATING PAN.

No. 253,124. Patented Jan. 31, 1882.

Witnesses: Chas. J. Buckheit, Edw. J. Brady

H. B. Stevens, Inventor.
By Wilhelm & Bonner, Attorneys.

N. PETERS. Photo-Lithographer. Washington, D. C.

(No Model.)   H. B. STEVENS.   2 Sheets—Sheet 2.
EVAPORATING PAN.
No. 253,124.   Patented Jan. 31, 1882.

Witnesses
Chas. J. Buchheit
Edw. J. Brady

Inventor:
H. B. Stevens
By Wilhelm & Bonner
Attorneys.

UNITED STATES PATENT OFFICE.

HENRY B. STEVENS, OF BUFFALO, NEW YORK, ASSIGNOR TO GEORGE L. SQUIER, OF SAME PLACE.

EVAPORATING-PAN.

SPECIFICATION forming part of Letters Patent No. 253,124, dated January 31, 1882.

Application filed June 8, 1881. (No model.)

*To all whom it may concern:*

Be it known that I, HENRY B. STEVENS, a citizen of the United States, residing at the city of Buffalo, in the county of Erie and State of New York, have invented new and useful Improvements in Evaporating-Pans, of which the following is a specification, reference being had to the accompanying drawings.

This invention relates to improvements in the construction of that class of evaporating apparatus for concentrating saccharine juices and other liquids in which steam is employed as the heating agent.

The object of this invention is to produce an evaporator which is simple in construction and easily managed, in which the evaporation is effected rapidly and uniformly, which permits of the ready removal of the scum, and of the complete discharge of the concentrated liquid, and which is easily cleaned.

My invention consists of the peculiar construction of the several parts, and of the several combinations of parts which enter into the construction of my improved evaporator, as will be hereinafter fully set forth.

Figure 1:
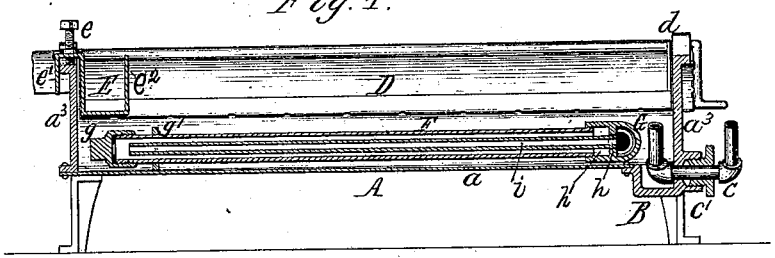
Figure 2:
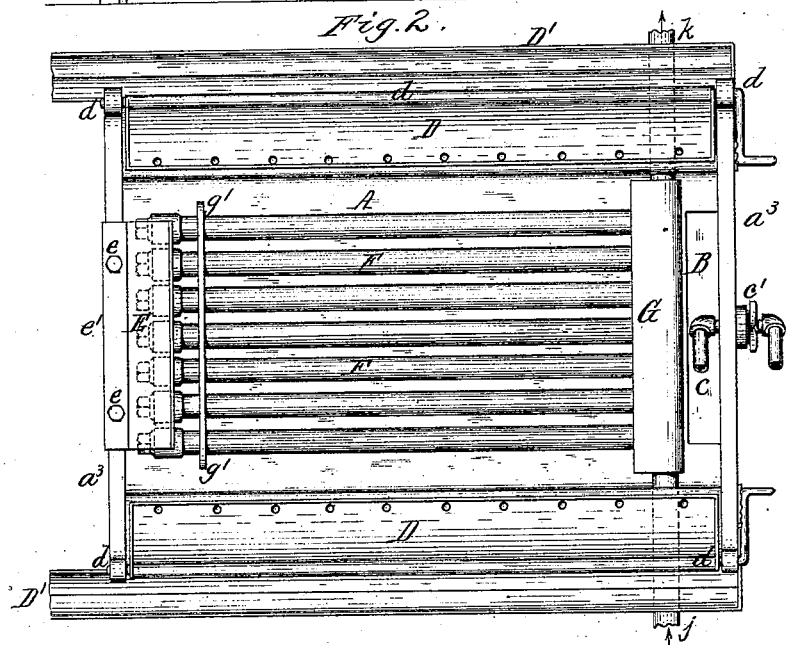
Figure 3:
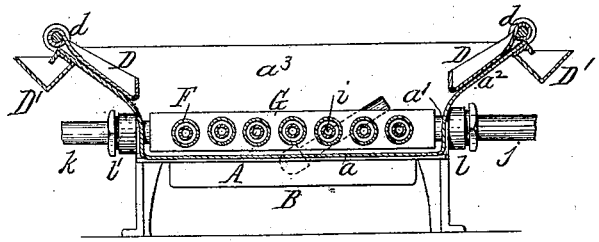
Figure 4:
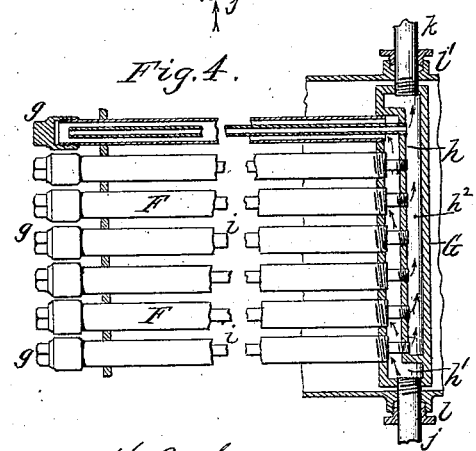
Figure 5:
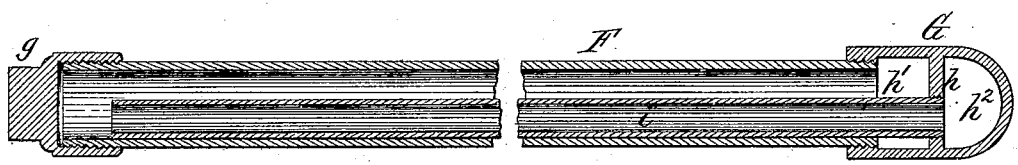
Figure 6:
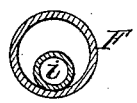

In the accompanying drawings, consisting of two sheets, Figure 1 is a longitudinal sectional elevation of my improved evaporator. Fig. 2 is a top plan view, and Fig. 3 a cross-section thereof. Fig. 4 is a fragmentary horizontal section of the steam-heating apparatus. Fig. 5 is a vertical longitudinal section of one of the steam-pipes on an enlarged scale. Fig. 6 is a cross-section thereof.

Like letters of reference refer to like parts in the several figures.

A represents the evaporating-pan, composed of a flat bottom, $a$, sides $a'$, having their upper portions, $a^2$, flaring outward, and vertical end plates, $a^3$. The latter are constructed of cast metal and provided with flanges, to which the sheet-metal bottom $a$ and sides $a'$ $a^2$ are riveted. The cast end pieces, $a^3$, serve to stiffen the pan and cause the latter to retain its shape, and afford at the same time a convenient means for forming a rivet-joint with the bottom and sides.

The bottom of the pan is provided at one end with a depressed or recessed portion, B, which, being lower than the bottom, serves to collect the liquid remaining in the pan after the bulk of the liquid has been drawn off. The portion of the bottom which forms the recess B is preferably cast in one piece with one of the end plates, $a^3$, as shown in the drawings. $c$ represents the pipe through which the concentrated liquid is discharged from the pan. This pipe is bent in the form of a U in a well-known manner, the horizontal portion of the pipe passing through a stuffing-box, $c'$, in one of the end plates, $a^3$, of the pan, so that the position of the arms of the pipe can be adjusted to raise the open ends of the pipe above the level of the liquid in the pan when the liquid is not to be drawn off, or to depress these open ends to a greater or less extent below the liquid-level, whereby the escape of the liquid through the pipe is regulated.

The horizontal portion of the pipe $c$ is arranged centrally in the depression B of the bottom, so that the inner arm of the pipe, when in its lowest position, will lie in the depression B and draw off the liquid which may be contained therein, thereby insuring a complete discharge of the liquid from the pan.

The flaring sides $a^2$ of the pan form cooling-surfaces, which serve to keep the foam down and facilitate the removal of the scum.

D represents movable scum-troughs arranged upon one or both of the flaring sides $a^2$ of the pan, for the purpose of gathering and removing the scum. As shown in the drawings, the troughs D are hinged to the pan at their upper ends at $d$, and provided in their bottoms with fine perforations or slots, through which the clear liquid drains back into the pan when the troughs are raised, while the scum remains in the troughs. The inner wall of each trough is arranged below the liquid-level in the pan, so that the scum is thrown over this inner wall into the trough during the operation of boiling. These troughs are raised and inverted from time to time by swinging them outward on their hinges, whereby the scum which has accumulated in the troughs is removed from the pan and discharged into troughs or conduits D', which are arranged outside of the pan, and conduct the scum to any desired place.

E represents a scum-gatherer, which is arranged at one or both ends of the pan and adjustably attached to the end plate, $a^3$, by set-screws $e$, or equivalent means, so that it can be adjusted to any desired height, as may be necessary. This gatherer E is preferably composed of a sheet of metal bent in the form represented in Fig. 1, and open at both ends. As shown in the drawings, the main portion of the sheet of metal constituting the gatherer E is bent in U or channel form, and provided at the side adjacent to the end plate, $a^3$, of the pan with a downwardly-projecting flange, $e'$, which overlaps the edge of the end plate and holds the gatherer E on the same. The inner wall, $e^2$, of the scum-gatherer rises to or above the liquid-level in the pan. During the operation of boiling two currents are established in the liquid, which currents run from the hottest end of the pan, along both sides thereof, toward the cooler end of the pan, where both currents meet and flow back through the middle of the pan. These two currents enter the open ends of the gatherer E and carry the scum into the latter. The inner high wall of the gatherer prevents the scum from being carried back into the pan. The accumulated scum is readily raked out or skimmed off, and any sediment which may settle on the bottom of the gatherer is readily removed by lifting the gatherer out of the pan.

F represents a series of steam-pipes arranged over the bottom of the pan and secured at one end to a manifold head, G. The opposite ends of the pipes F are closed by screw-caps $g$, which are provided with square or hexagonal ends, or otherwise formed to be readily turned by a wrench. The pipes F are connected near their free ends by a plate or bar, $g'$, provided with openings, in which the pipes rest, and whereby the pipes are prevented from warping or otherwise changing their relative position.

The manifold head G is divided by a longitudinal partition or diaphragm, $h$, into two chambers, $h'$ $h^2$, the chamber $h'$ receiving the live steam and communicating with the pipes F, and the chamber $h^2$ receiving the condensation and steam which escape from the pipes F by means of small return-pipes $i$. The latter are arranged within the pipes F, and screwed with one end into openings in the partition $h$, so as to communicate with the chamber $h^2$, while their opposite ends open near the ends of the pipes F. The steam passes freely from the chamber $h'$ into all of the pipes F and heats the same thoroughly and uniformly on all sides, and the water resulting from the condensation of the steam and the steam which has lost a part of its caloric are rapidly carried off through the pipes $i$ and chamber $h^2$, so as not to exert any cooling effect upon the liquid surrounding the pipes. The pipes $i$ are arranged on the bottom of the pipes F, as clearly shown in Fig. 5, and the pipes F are preferably slightly inclined from the manifold head G toward their free ends, whereby the water of condensation is caused to flow toward the mouths of the return-pipes $i$, and caused to enter the latter by the currents of steam which pass through the pipes F and into the pipes $i$. The liquid in the pan is by this means heated uniformly and rapidly, so that a lively ebullition is maintained at all times in every part of the pan exposed to the heating action of the pipes F, which is an essential requirement in concentrating saccharine juices. All of the pipes F are heated to the same temperature, and thereby prevented from warping out of shape. Each pipe can be separately removed from the manifold head without disturbing the rest of the pipes, when necessary for making repairs, and the inner exhaust-pipes, $i$, are easily reached by unscrewing the caps $g$.

$j$ represents the pipe through which live steam is admitted to the chamber $h'$ of the manifold head G, and $k$ represents the pipe through which the condensation and waste steam are exhausted from the chamber $h^2$ of the manifold head. The pipes $j$ and $k$ are arranged in line with each other and pass through stuffing-boxes $l$ $l'$ in the lower parts of the side walls of the pan, so that these pipes and the manifold head G can be readily turned in these stuffing-boxes in such manner that the pipes F are swung from a horizontal to a perpendicular position. The stuffing-boxes serve as journal-boxes for the pipes $j$ $k$, and form tight joints in the sides of the pan. By this means the pipes F are readily swung out of the way when the pan is required to be cleaned, and the pipes themselves are exposed, so that they can be thoroughly cleaned on all sides.

Instead of passing the pipes $j$ and $k$ through stuffing-boxes, as shown, the portions of these pipes which are outside of the pan may be stationary and connected with hollow trunnions arranged in the side walls of the pan, and communicating respectively with the steam-chamber $h'$ and exhaust-chamber $h^2$ of the manifold head.

The steam inlet and escape pipes $j$ $k$ are provided with cocks for regulating the flow of steam and water through the same.

I claim as my invention—

1. An evaporating-pan having its bottom provided with a depression, B, in combination with a bent discharge-pipe, $c$, adapted to be turned down into the depression B, substantially as set forth.

2. An evaporating-pan constructed with a cast end piece, $a^3$, having a depression, B, cast therein, to accommodate the bent discharge-pipe $c$ when turned down, and provided with a water-tight joint, $c'$, through which the pipe $c$ passes, substantially as set forth.

3. The combination, with an evaporating-pan, of one or more scum-gatherers, E, constructed with open ends for the admission of the scum, substantially as set forth.

4. The combination, with an evaporating-pan, of a scum-gatherer, E, constructed with open ends for the admission of the scum, and having its inner wall projecting to or above the level of the liquid to prevent the escape of the scum, substantially as set forth.

5. The combination, with an evaporating-pan, of a scum-gatherer made vertically adjustable, substantially as set forth.

6. The combination, with an evaporating-pan, of hinged scum-troughs D and removable scum-gatherer E, substantially as set forth.

7. The combination, with the manifold head G, of the straight diaphragm $h$, cast in one piece with the head G, steam-supply pipe $j$, and exhaust-pipe $k$, communicating respectively with chambers on opposite sides of the diaphragm, substantially as set forth.

8. The combination, with the steam-pipes F, of exhaust-pipes $i$, arranged on the bottoms of the pipes F, substantially as set forth.

9. The combination, with the manifold head G, of the steam-pipes F, exhaust-pipes $i$, arranged in the pipes F, and caps $g$, applied to the open end of the pipes F, substantially as set forth.

10. The combination, with an evaporating-pan, of steam-heating pipes F, movable scum-troughs D, and a bent discharge-pipe, $c$, substantially as set forth.

11. The combination, with an evaporating-pan, of steam-heating pipes F, connected with the pan by trunnions, movable scum-troughs D E, and bent discharge-pipe $c$, substantially as set forth.

H. B. STEVENS.

Witnesses:
 J. W. PARKER,
 GEO. P. SQUIER.